Oct. 20, 1970    P. J. M. LALLEMANT    3,534,464
PROCESS FOR SECURING LININGS TO FRICTION DISCS
Filed Oct. 4, 1967
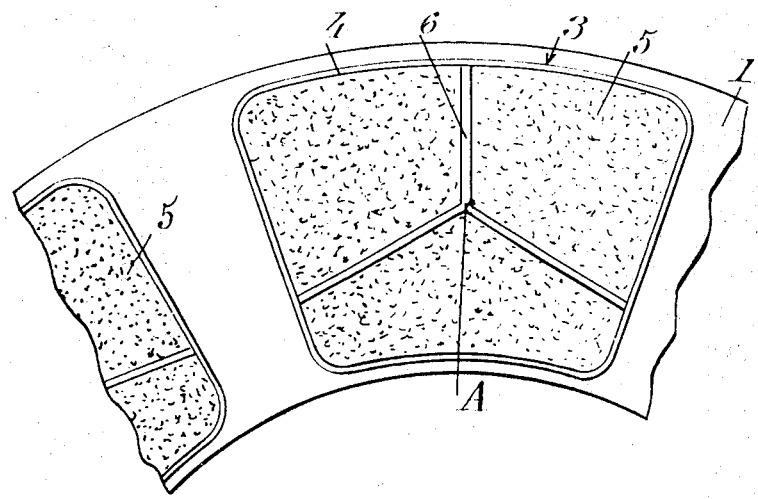
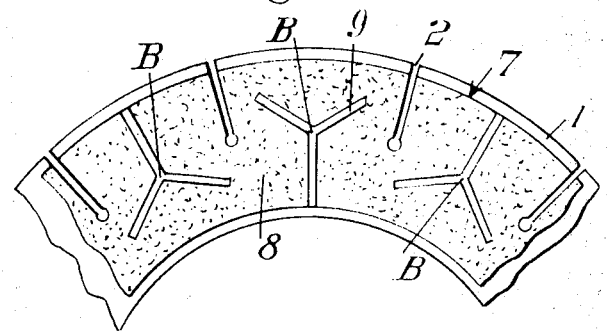

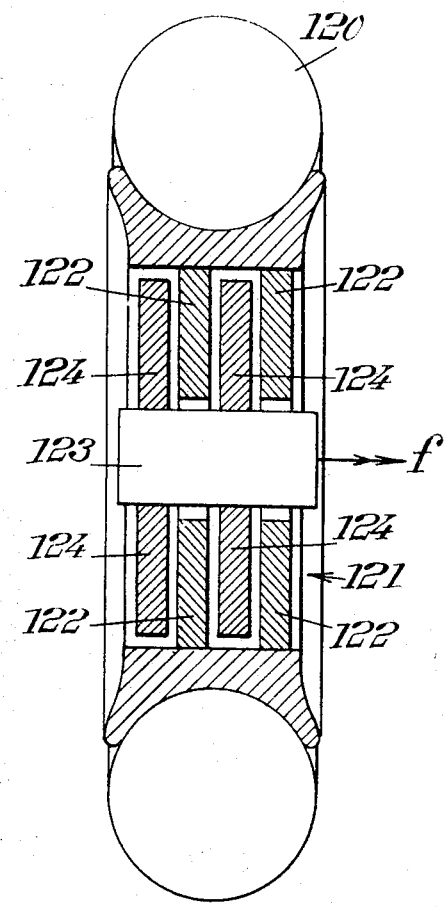

United States Patent Office 3,534,464
Patented Oct. 20, 1970

3,534,464
PROCESS FOR SECURING LININGS TO
FRICTION DISCS
Pierre Joseph Martin Lallemant, Port-Marly, France, assignor to Societe Hispano-Suiza-Lallemant, Bois-Colombes, France
Filed Oct. 4, 1967, Ser. No. 672,910
Claims priority, application France, Oct. 6, 1966, 79,025
Int. Cl. B23k 31/02
U.S. Cl. 29—471.3    16 Claims

ABSTRACT OF THE DISCLOSURE

In this process a ribbed structure and a sinterable material are placed on a part of an annular body of a friction disc, and the sinterable material is sintered to weld the ribbed structure to the part in question.

---

The present invention relates to a process for securing linings to rotatable or non-rotatable friction discs, the expression "friction disc" designating here an annular body (formed in a single piece or in a plurality of distinct, interconnected sectors) on which at least one lining is to be fixed, this lining being intended to cooperate by friction with at least one other member wtih which the friction disc comes into contact and with respect to which it has a speed of relative rotation.

The friction discs constructed according to the invention can in particular be mounted in brakes having multiple discs, in particular brakes for aviation wheels, for it is in this application that the energy which the brake must absorb is the greatest.

It has already been proposed to secure linings on friction brakes by essentially forming the lining of a sinterable material secured, directly or indirectly, by sintering, to the annular body of the friction disc.

It has also been proposed, in order to reduce the risk of tearing of the lining secured by sintering, to provide the annular body with a ribbed structure, rigid with the annular body, extendng into the lining and having in the direction perpendicular to the plane of the annular body a dimension substantially equal to the thickness of the layer of material added by sintering.

The problem raised by the manufacturing of friction discs of this type resides then in the method to be adopted to render the ribbed structure rigid with the annular body. Until the present time, the methods have included costly operations such as, for example, machining the annual body in order to make the ribbed structure appear, or again, welding or rivetting the ribbed structure to the annular body.

The process according to the present invention permits a friction disc to be obtained comprising a ribbed structure whose duration of manufacturing and whose cost price are of the same order of magnitude as for a conventional friction disc not having a ribbed structure, and in any case, much lower than for a friction disc having a ribbed structure but manufactured by the methods mentioned above.

The process according to the invention is characterized by the fact that the ribbed structure is welded to the annual body or to a metal saucer rigid with the annular body in the course of the operation of sintering the material forming the lining.

Certain other features of the invention will become more apparent from the following description, given merely by way of example, of particular embodiments of the invention, with reference to the accompanying drawings.

In the drawings:

FIG. 1 shows, by a partial front view, a friction disc for an aviation brake constructed according to a first embodiment of the invention.

FIG. 2 shows, in the same conditions as FIG. 1, a friction disc for an aviation brake constructed according to another embodiment.

Figure 3:
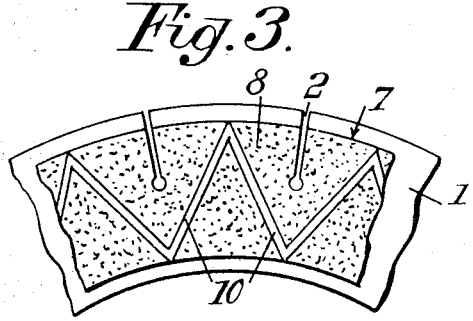
FIGS. 3 to 6 illustrate variations of the embodiment shown in FIG. 2.

And FIG. 7 illustrates schematically by an axial section an assembly formed by a wheel and a disc brake in which some of the friction discs are constructed according to the invention.

Referring first of all to FIG. 7, the disc brake 121 is arranged, in its overall aspect, in any appropriate manner, with the only condition being that it comprises at least one friction disc moving in rotation with a wheel 120 to be braked—for example two rotating discs 122 as shown in FIG. 7—this friction disc being adapted to cooperate, following a relative axial displacement, with at least one non-rotating friction disc—for example two non-rotating discs 124 as shown in FIG. 7—rigid in rotation (or rather in the absence of rotation) with a non-rotating structure 123.

The relative axial displacement of the rotating disc 122 with respect to the non-rotating disc 124 can, for example, be obtained by displacing all or part of the non-rotating structure 123 in the direction of the arrow f.

As show in FIGS. 1 to 6, the friction disc comprises principally an annular body 1 provided, on at least one of its faces, with at least one lining intended to co-operate by friction (during the operation of the brake) with at least one other member with which this friction disc comes into contact and with respect to which it has a speed of relative rotation.

Although the principal feature of the present invention, which will be described in detail hereafter, can be applied to a friction disc whose annular body 1 is formed of a plurality of distinct, interconnected sectors, the above mentioned principal feature will be described, by way of example, with reference to a friction disc whose annular body 1 is formed in a single piece, with means, such as radial slots 2 visible in FIGS. 2 to 6, being provided to avoid deformations (buckling or conical conformation in particular) prejudicial to the operation of the brake.

The lining of the friction disc then essentially comprises a material added by sintering, directly or indirectly, to the annular body 1 of the friction disc.

A ribbed structure is then provided rigid with the annular body 1, directly or indirectly, extending into the lining, and having in the direction perpendicular to the plane of the annular body 1, a dimension substantially equal to the thickness of the layer of material added by sintering.

For this purpose, the embodiment illustrated in FIG. 1 can advantageously be used according to which the annular body 1 of the friction disc is equipped with several linings 3, successive and regularly distributed, each of these linings 3 comprising, A meal saucer 4 of trapezoidal shape, rigidly connected, by means not shown, to the annular body 1, And a layer of material 5, sintered in this metal saucer 4.

Under these conditions, the ribbed structure of such a lining 3 can comprise at least three ribs 6 converging at a point A situated in the central zone of this lining 3.

In the case in which three ribs 6 are adopted, these ribs are preferably disposed at 120°, one of them being oriented radially in the direction of the outer edge of the saucer 4.

The embodiment illustrated in FIG. 2 can also be used to advantage in which the annular body 1 of the friction disc is equipped with a single lining 7 of annular shape comprised by a layer of material 8 sintered directly to the annular body 1.

Under these conditions, the ribbed structure of such a lining 7 can comprise a plurality of regularly distributed groups of ribs 9, each group comprising at least three ribs converging at a point B situated on the mean circle of the friction disc.

In the case in which groups of ribs 9 comprising three ribs each are adopted, these ribs are disposed at 120°, one of them being oriented radially, alternately in the direction of the outer edge of the annular body 1 and in the direction of the inner edge of the annular body 1.

Alternatively, variations of the embodiment illustrated in FIG. 2 can be used, these variations being shown respectively in FIGS. 3, 4, 5 and 6 in which the same elements have been designated by the same reference characters as in FIG. 2.

According to the variation shown in FIG. 3, the ribbed structure comprises a single rib 10 folded in the form of an accordeon and closed on itself, the amplitude of the folds of this single rib 10 being equal, approximately at least, to the radial extent of the layer of sintered material 8.

Figure 4:
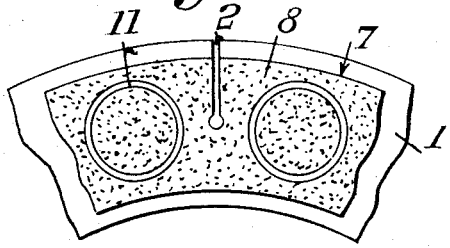

According to the variation shown in FIG. 4, the ribbed structure comprises a plurality of ribs of circular form 11, regularly distributed, the diameter of each of these ribs 11 being a little less than the radial extent of the layer of sintered material 8.

Figure 5:
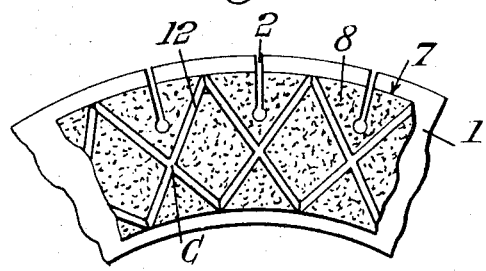

According to the variation shown in FIG. 5, the ribbed structure comprises a plurality of adjacent groups of ribs 12, each group comprising four ribs converging at a point C situated in the neighbourhood of the mean circle of the friction disc and disposed symmetrically about a radial line passing through this point C.

Figure 6:
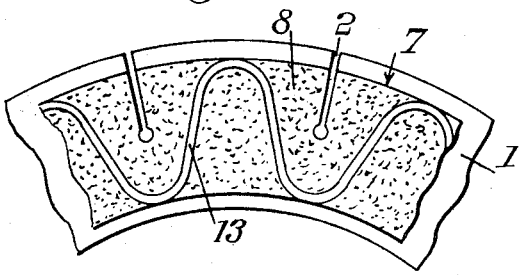

Finally, according to the variation shown in FIG. 6, the ribbed structure comprises a single rib 13 folded in sinusoidal form and closed on itself, the amplitude of the folds of this single rib 13 being equal, approximately at least, to the radial extent of the layer of sintered material 8.

Whatever embodiment is chosen, the process according to the present invention can be applied thereto, this process being characterized by the fact that the ribbed structure is welded to the metal saucer 4 (FIG. 1) or to the annular body 1 (FIGS. 2 to 6) during the operation of sintering of the layer of material 5 (FIG. 1) or 8 (FIGS 2 to 6).

Thus, to carry out this process, the ribbed structure and the sinterable material are placed on the part of the annular body to which the lining is to be fixed (either on the metal saucer 4—FIG. 1—or on an integral part of the annular body 1—FIGS. 2 to 6) and the sinterable material is sintered to weld said ribbed structure to the part in question.

When the metal saucer 4 or the annular body 1 is of steel, the ribbed structure also of steel, and the material 5 or 8 to be sintered contains cobalt powder, the sintering temperature being 1100° C., there is produced, between the metal saucer 4 or the annular body 1 and the ribbed structure, a weld by cobalt-steel diffusion.

When the metal saucer 4 or the annular body 1 is of steel, the ribbed structure also of steel, and the material 5 or 8 to be sintered contains copper powder, the sintering temperature being 1080° C., there is produced, between the metal saucer 4 or the annular body 1, and the ribbed structure, a braze by fusion.

When the metal saucer 4 or the annular body 1 is of steel, the ribbed structure also of steel, and the material 5 or 8 to be sintered contains nickel powder, the temperature of sintering being 900° C., there is produced, between the metal saucer 4 or the annular body 1 and the ribbed structure, a weld by nickel-steel diffusion.

Finally, if in the same conditions as hereabove, the sintering temperature is 1400° C., there is produced, between the metal saucer 4 or the annular body 1 and the ribbed structure, a weld by fusion.

As a result of the present invention, a friction disc is provided, which can for example be used for disc brakes having multiple discs for aviation wheels, whose linings have an increased longevity due to the reduced risk of deterioration of the layer of the added material of these linings by tangential tearing of the material during operation of the brake, the speed and the cost of manufacture of such a friction disc remaining of the same order of magnitude as for a conventional friction disc.

Although the present invention has been described with specific reference to particular embodiments, it should be understood that the invention is not limited thereto, and that there could be various modifications made without departing from the spirit or scope of the invention.

What I claim is:

1. A process for securing a lining to a metal part of an annular body of a friction disc to which at least one lining essentially comprising a sinterable material is to be secured by sintering to form a friction disc having a lining including a metal ribbed structure, said lining and its ribbed structure being rigid with said part of said annular body, and said ribbed structure extending into said lining and having in the direction perpendicular to the plane of said annular body a dimension substantially equal to the thickness of said lining, comprising the steps of placing said ribbed structure and said sinterable material on said part of said annular body, and heating the whole both to sinter said sinterable material and to weld said ribbed structure to said part in the same step.

2. A process according to claim 1 wherein said lining consists essentially of said sinterable material and said ribbed structure and in which said part is a saucer which is, in turn, fastened to said body of said friction disc.

3. A process according to claim 1 in which said part is an integral part of said body of said friction disc.

4. A process according to claim 1 in which said metal part of said annular body is of steel, and said ribbed structure is also of steel.

5. A process according to claim 4 in which said sinterable material contains cobalt powder, and the temperature of sintering is 1100° C., the weld produced between said part and said ribbed structure being a weld by cobalt-steel diffusion.

6. A process according to claim 4 in which said sinterable material contains copper powder, and the temperature of sintering is 1080° C., the weld produced between said part and said ribbed structure being a braze by fusion.

7. A process according to claim 4 in which said sinterable material contains nickel powder, and the temperature of sintering is 900° C., the weld produced between said part and said ribbed structure being a weld by nickel-steel diffusion.

8. A process according to claim 4 in which said sinterable material contains nickel powder, and the temperature of sintering is 1400° C., the weld produced between said part and said ribbed structure being a weld by fusion.

9. A process according to claim 2 in which a plurality of metal saucers are provided, said ribbed structure being placed in each saucer in the form of at least three ribs converging at a point situated in the central zone of each said saucer, and being welded to said saucer by the heating used for sintering said sinterable material in said saucer, said plurality of saucers being successively and regularly distributed around and fastened to said annular body with said linings facing away from said annular body.

10. A process according to claim 9 in which said three ribs are disposed at 120° with respect to one another, one of said ribs being oriented radially in the direction of the outer edge of said saucer.

11. A process according to claim 3 in which one side of said annular body is provided with a single lining of annular shape, said ribbed structure being placed on said one side in the form of a plurality of regularly distributed groups of ribs, each group comprising at least three ribs converging at a point situated substantially on the mean circle of said annular body.

12. A process according to claim 11 in which each said group of ribs comprises three ribs disposed at 120° with respect to one another, one of said ribs being oriented radially, alternately from one group to its adjacent group in the direction of the outer edge of the annular body and in the direction of the inner edge of the annular body.

13. A process according to claim 3, in which one side of said annular body is provided with a single lining of annular shape, said ribbed structure being placed on said one side in the form of a single rib folded in the form of an accordeon and closed on itself, the amplitude of the folds of said single rib being equal, approximately at least, to the radial extent of the layer of sintered material.

14. A process according to claim 3 in which one side of said annular body is provided with a single lining of annular shape, said ribbed structure being placed on said one side in the form of a plurality of ribs of circular shape, regularly distributed, the diameter of each of said ribs being a little less than the radial extent of the layer of sintered material.

15. A process according to claim 3 in which one side of said annular body is provided with a single lining of annular shape, said ribbed structure being placed on said one side in the form of a plurality of adjacent groups of ribs, each group comprising four ribs converging at a point situated in the neighbourhood of the means circle of said annular body, the ribs of each group being disposed symmetrically about the radial direction passing through said point.

16. A process according to claim 3 in which one side of said annular body is provided with a single lining of annular shape, said ribbed structure being placed on said one side in the form of a single rib folded in sinusoidal shape and closed on itself, the amplitude of the folds of said single rib being equal, approximately at least, to the radial extent of the layer of sintered material.

References Cited

UNITED STATES PATENTS

| | | | |
|---|---|---|---|
| 587,493 | 8/1897 | Sargent | 188—255 |
| 2,251,410 | 8/1941 | Koehring et al. | 188—251 |
| 2,783,529 | 3/1957 | Huntress | 188—251 |
| 2,728,700 | 12/1955 | Gatke | 192—107 XR |
| 2,850,118 | 9/1958 | Byers | 188—251 XR |
| 2,966,737 | 1/1961 | Spokes et al. | 192—107 XR |
| 3,345,734 | 10/1967 | Sowko | 29—471.1 |
| 3,390,750 | 7/1968 | Albertson | 188—251 |

OTHER REFERENCES

"Cerametalix" an article on Brake Linings by Bendix.

JOHN F. CAMPBELL, Primary Examiner

R. B. LAZARUS, Assistant Examiner

U.S. Cl. X.R.

29—471.1